United States Patent
Young et al.

(10) Patent No.: US 9,411,492 B1
(45) Date of Patent: *Aug. 9, 2016

(54) ADDING INFORMATION TO A CONTACT RECORD

(71) Applicant: Google Inc., Mountain View, CA (US)

(72) Inventors: David S. Young, San Francisco, CA (US); Michael H. Leggett, Mountain View, CA (US); Braden F. Kowitz, San Francisco, CA (US); Benjamin Grol, San Francisco, CA (US)

(73) Assignee: Google Inc., Mountain View, CA (US)

( * ) Notice: Subject to any disclaimer, the term of this patent is extended or adjusted under 35 U.S.C. 154(b) by 313 days.

This patent is subject to a terminal disclaimer.

(21) Appl. No.: 14/142,111

(22) Filed: Dec. 27, 2013

Related U.S. Application Data

(63) Continuation of application No. 12/691,142, filed on Jan. 21, 2010, now Pat. No. 8,621,382.

(51) Int. Cl.
  *G06F 3/048* (2013.01)
  *G06F 3/0482* (2013.01)

(52) U.S. Cl.
  CPC .................................. *G06F 3/0482* (2013.01)

(58) Field of Classification Search
  CPC .............................................. G06F 17/30884
  USPC .......................... 715/739, 780, 816, 810, 700
  See application file for complete search history.

(56) References Cited

U.S. PATENT DOCUMENTS

| | | |
|---|---|---|
| 2002/0069097 A1 | 6/2002 | Conrath |
| 2003/0023759 A1 | 1/2003 | Littleton et al. |
| 2004/0103367 A1 | 5/2004 | Riss et al. |
| 2005/0114021 A1 | 5/2005 | Krull et al. |
| 2007/0032267 A1 | 2/2007 | Haitani et al. |
| 2007/0266331 A1 | 11/2007 | Biker et al. |
| 2009/0158200 A1 | 6/2009 | Palahnuk et al. |

OTHER PUBLICATIONS

Karger, David R. "Haystack: Per User Information Environments." Computer Science and Artificial Intelligence Laboratory, MIT; Jan. 29, 2006.
Bimlendu, Roy. "What Is AutoComplete in MS Excel?" eHow.com [Retrieved on Jan. 19, 2011]. Retrieved from the Internet <URL: http://www.ehow.com/facts_556815_autocomplete-ms-excel-html>(2 pages).
Bott, Ed and Woody Leonhard. "Special Edition: Using Microsoft Office 2003: The Only Office 2003 Book You Need." Ed Bott and Phuket Island Song Pen Co., Ltd, 2004, 6 pages.
Time Atlas. "Advantages of Outlook AutoResolve and AutoComplete." [Retrieved on Jan. 19, 2011]. Retrieved from the Internet <URL: http://www.timeatlas.com/email/outlook/advantages_of_outlook_autoresolve_and_autocomplete> (3 pages).

*Primary Examiner* — Tadeese Hailu
*Assistant Examiner* — Darrin Hope
(74) *Attorney, Agent, or Firm* — Fish & Richardson P.C.

(57) ABSTRACT

In general, the subject matter described in this specification can be embodied in methods, systems, and program products. A display for a particular contact record is presented. The display includes a name for a particular contact and a generic input area. Each of a plurality of contact records identifies a name for a contact, and each of the plurality of contact records is configured to store multiple entries that each include a value and a field type from a plurality of field types. User input of information using the generic input area is received. A field type from the plurality of field types is determined based on matching semantics of the received user input. The determining occurs without receiving user input specifically identifying the matching field type. The determined field type and the received user input is stored as an entry for the particular contact record.

20 Claims, 10 Drawing Sheets

ADDING INFORMATION TO A CONTACT RECORD

TECHNICAL FIELD

This document generally describes techniques, methods, systems, and mechanisms for adding information to a contact record.

BACKGROUND

The present disclosure generally relates to information storage. Users of electronic computing devices rely more and more on these devices to store information about their lives and their interactions with other individuals. For example, instead of writing down friends and business associates' contact information in physical address books, an increasing number of people store such information in electronic address books, or contact lists, made up of multiple contact records. These address books can be found in mobile telephones, email application programs, cloud-based email services, contact lists on social networking sites, stand-alone electronic contact record management applications, and publicly available business directories accessible through the internet.

A contact record can include information for a specific contact (e.g., a person or a business) and may include multiple entries. For example, a contact record for "John Milke" may include entries for John's personal email address, cellular telephone number, work telephone number, home physical address, picture, birth date, and job title. Each entry may include a value and a tag that identifies the type of the information. As an illustration, a contact record entry may include the value "johnm@exampleemail.com" and an associated "email" field type tag.

Identifying values stored in association with a particular contact record with different field type tags allows a computing device to perform different actions upon user-selection of the contact record entry. For example, selecting an entry identified as an "email address" in a display for John's contact record may generate a new email message that is addressed to the value for the selected record. Selecting an entry that is identified as a telephone number may initiate a call to the associated telephone number. Selecting an entry that is identified as a physical address may invoke the display of a map that presents the location of the physical address. The use of field type tags can also facilitate the exporting and importing of contact record entries.

A user of an electronic contact list can assign a field type to values that the user enters for an address book contact record entry. Assigning field types can be burdensome because users need to select an input box that is pre-associated with a field type and type the value into the selected input box, or type the information into an input box that can have multiple types and subsequently use an interface element to select a field type for the information.

SUMMARY

This document describes techniques, methods, systems, and mechanisms for adding information to a contact record. In general, a user may call up for display on a computer monitor a contact record for a particular contact. The displayed contact record can include information about that particular contact, and a generic input area. The generic input area allows the user to enter values for any of multiple types of information (e.g., an address, a telephone number, or an email address). A computing device can determine an associated field type for each entered value and store the entered values and the associated field type in memory.

As an illustration, a user of a mobile telephone (e.g., Jessica) has recently befriended Allison at work. Jessica and Allison make plans to meet over the weekend to shop and get some strawberry shakes. Just as Allison is about to leave for the bus on Friday afternoon, Jessica asks for Allison's contact information. Jessica had previously entered Allison's name and work telephone number into her telephone, but does not have Allison's mobile telephone number or any other information. Jessica pulls out her telephone (a smart telephone, or application telephone), presses an icon for the address book, scrolls to Allison's name, and taps on Allison's name to draw up Allison's contact record.

Allison's contact record fills the screen of Jessica's mobile telephone and displays Allison's name, Allison's work telephone number, and a single text entry box that is configured to receive information, assign a field type to the received information, and generate a contact record entry from the received information. Jessica taps on the touchscreen where the general use text entry box is displayed and a virtual keyboard pops up on the touchscreen display. Jessica asks verbally for Allison's mobile telephone number, email address, and birthday.

Allison quickly speaks her email address, telephone number, and birthday in order. As Allison speaks each kind of contact information, Jessica types the information into her telephone and hits the telephone's enter key at the end of each kind of contact information. Allison runs down the hallway to catch the bus, and the two women agree to meet to go to the mall over the weekend.

After Allison has left, Jessica looks down at her telephone to see that she entered the contact information correctly. Jessica sees that Allison's contact record now includes four contact record entries: a work telephone number, a mobile telephone number, an email address, and an anniversary. Associated with each entry is a label that displays a type of the information for each entry. As Jessica typed the contact information into her telephone, the telephone attempted to identify a field type for each kind of entered contact information. As Jessica typed the information, the telephone displayed a best match field type for the information. Upon Jessica hitting the enter key, the value presently entered in the input box and the presently determined field type were automatically stored as a contact record entry. The input area had also cleared of information automatically, allowing Jessica to enter a new kind of contact information using the same input area.

Jessica then recognizes that her telephone had rearranged the information to appear in an order that is common to all of her contact records. Jessica also recognizes that the telephone improperly guessed that the entered date was an anniversary instead of a birthday. Jessica modifies the field type by tapping her finger on the label that displays "Anniversary." A drop down list appears and Jessica selects "Birthday" from the options "Mobile telephone number," "Home telephone number," "Work telephone number," "Home Address," "Work address," "Work email," "Personal email," "Birthday," and "Anniversary."

Jessica now remembers that she is supposed to pick Allison up at her house, but did not ask for her home address. She texts Allison and Allison replies with her home address. Jessica navigates back into the display for Allison's contact record, selects the input area, and types in Allison's home address, or pastes the address text in after performing operations needed to select the address. As Jessica types the address, the telephone automatically identifies the address as a "Work address" and an interface element that displays "Work address" appears next to the input area. Jessica notices that the telephone has properly detected that the information is an address, but improperly identified the type of information as a "work" address instead of a "home" address. Jessica taps on the interface element and a drop down list appears of various field types appears. Jessica selects "Home address" and the drop down list collapses to indicate that the home address field type is now selected. Jessica hits the enter key to confirm the field type, and a "Home address" contact record entry is automatically added to Allison's contact record.

The automatic identification of field types can occur over multiple domains. Specifically, Jessica's telephone matches the entered values with a field type both locally with a computer processor on the telephone and remotely by querying a network of servers. As Jessica types information into the input area, but before she hits "enter" to confirm a displayed field type, the telephone can use type-identification algorithms stored locally within the telephone to identify a matching field type. For example, if the typed information includes an "@" symbol, the telephone may match the typed value with an "email" field type. If the typed value includes "www," the telephone may match the typed value with a "web address" field type. A set of algorithms can be used to identify the most likely match for an entered value.

In some examples, Jessica's telephone may query a server system to determine a type for a value entered into the input area. For example, Jessica may type "Apt. 13 @ The Palace Apt. Complex, Washington D.C." The type-identification algorithms executed by Jessica's telephone may both identify the entered information as an email address (because of the "@" symbol) and an address (because "Washington D.C." is a city). Thus, the typed string may be transmitted to a server system for more complete and processing-intensive field type identification.

In some implementations, the typed string is submitted to a server system that performs geocoding (e.g., a map search). The geocoding server system may be able to identify whether the entered string corresponds to a real-world location. For example, if a user navigated to a webpage for a map search engine and submitted the query "Apt. 13 @ The Palace Apt. Complex, Washington D.C.," a pin may appear on the map for an apartment complex in Washington D.C. On the other hand, The Palace Apt. Complex may not exist, and an error message would appear. The same map search engine may be queried by Jessica's telephone and may return an indication of whether the address corresponds to a real-world location. For example, a database of existing road names may be queried to determine if the typed string, or a portion thereof, is an address.

In some implementations, the server system submits the input value to a machine learning system. The machine learning system may be trained on a large set of data that includes sets of values and associated field types. The machine learning system can analyze the input string in view of the data set and return a matching field type. The data set can be drawn from a repository of contact records from multiple users. For example, Jessica's telephone service provider may store anonymous copies of contact records of users for the purpose of assisting in field type recognition. The telephone service may provide users the option of preventing their contact records from being used in field type determination for other users. The machine learning system can modify its data set to train on user modifications of field types that were incorrectly determined by the machine learning system.

In some implementations, the server system stores a repository of contact records for a plurality of users. An input value string typed by Jessica may be compared against contact record entries from the plurality of contact records to identify entries that have a matching value. In some examples, the most common field type among the identified entries is selected as the matching field type for Jessica's input value string. For example, five other contact records may include contact record entries that contain the value "Apt. 13 @ The Palace Apt. Complex, Washington D.C." Four of the entries may be associated with the field type "Home address" and one of the entries may be associated with the field type "Other Information." Thus, the server system can provide Jessica's telephone with an indication that the typed string matches a "Home address" field type.

In some implementations, the server system not only compares the newly typed values to fields in other contact records, but also compares values in existing entries for Allison's contact record to other fields. For example, other contact records from the repository may be for a contact "Allison" that shares the same telephone number, and may include a home address of "2200 13th Ave, Apt. 13, Washington, D.C." Because the contact record for "Allison" on Jessica's telephone includes a matching name and telephone number entry for other contact records, and because the input value is similar to the "Home address" entry for the other contact records, the typed information can be assigned the "Home address" type.

In general, the subject matter described in this specification can be embodied in methods, systems, and program products for assigning a field type to information added to a contact record. A display for a particular contact record is presented on a graphical user interface of a computing device. The display includes a name for a particular contact that is represented by the particular contact record and a generic input area. The particular contact record is from a plurality of contact records that are stored in computer memory. Each of the plurality of contact records identifies a name for a contact that is represented by the contact record. Each of the plurality of contact records is configured to store multiple entries that each include a value and a field type from a plurality of field types. User input of information is received using the generic input area. A field type from the plurality of field types is determined based on matching semantics of the received user input. The determining occurs without receiving user input specifically identifying the matching field type. The determined field type and the received user input as the value for the determined field type is stored as an entry for the particular contact record.

Another aspect of the subject matter described in this specification can be embodied in a system for assigning a field type to information added to a contact record. Computer memory stores a plurality of contact records that each identify a name for a contact that is represented by the contact record, and is configured to store multiple contact record entries that each include a value and a field type from a plurality of field types. A display device of a computing device presents to a user a display for a particular contact record from the stored plurality of contact records. The display includes a name for a particular contact that is represented by the particular contact record and a generic input area. A user input interface of the computing device receives user input of information in cooperation with the generic input area. The system includes means for determining a field type based on matching a semantics of the received user input. The determining is performed without receiving user input that specifically identifies the matching field type. A contact record updating module stores, in an entry of the particular contact record, the determined field type and the received user input as the value for the determined field type.

Yet another aspect of the subject matter described in this specification can be embodied in a a system for assigning a field type to information added to a contact record. Computer memory stores a plurality of contact records for a user. Each of the contact records identifies a name for a contact that is represented by the contact record. Each of the contact records is configured to store multiple contact record entries that each include a value and a field type from a plurality of field types. A display device of a computing device presents to a user a display for a particular contact record from the stored plurality of contact records. The display includes a name for a particular contact that is represented by the particular contact record and a generic input area. A user input interface of the computing device receives user input of information in cooperation with the generic input area. A server system receives the user input from the computing device and determines a field type based on matching semantics of the received user input. The determining occurs without receiving user input that identifies the determined field type. A contact record updating module stores in an entry of the particular contact record the determined field type and the received user input as the value for the determined field type.

These and other implementations can optionally include one or more of the following features. The plurality of field types can include a physical address field type, an email address field type, a website address field type, and a telephone number field type. In response to determining the field type, an interface element of selectable field types that displays the determined field type as a selected field type may be presented in the display for the particular contact record. Before determining the field type, the display for the particular contact record may not present the interface element with the determined field type as selected. In response to determining the field type, user confirmation of the determined field type may be received. A contact record entry that shows the received user input and the confirmed field type may be added to the display for the particular contact record. A cleared generic input area may be presented in the display for the particular contact record. In response to determining the field type, an interface element of selectable field types that displays the determined field type as a selected field type may be presented in the display for the particular contact record. Prior to determining the field type the display for the particular contact record may not present the interface element with the determined field type as selected. User modification of the determined field type using the interface element of selectable field types may be received. A contact record entry that shows the received user input and modified field type may be added to the display for the particular contact record. A cleared generic input area may be presented in the display for the particular contact record.

Multiple sets of received user input and field types that the user confirms with user input may be received with the generic input area. The multiple sets may be received in a first order. A contact record entry for each set of received user input and confirmed field type may be presented in the display. The contact record entries may be displayed in a second order that is different than the first order. The second order may be determined by a predetermined order of display of entries based on entry field types. The generic input area may not be associated with a field type before determining the field type. The generic input area may be the only generic input area presented in the display for the particular contact record. The user input may include a picture. A repository of user-supplied signature blocks from electronic communications may be accessed. Field types for portions of each user-supplied signature may be identified. The received user input may be compared to the portions of user-supplied signatures in the repository. The determining the field type may include selecting as the determined field type a field type that corresponds to portions of the user-supplied signatures that match the received user input.

A portion of a user-supplied signature may match the received user input if the portion and the user input are the same. The server system may access a repository of contact records that are from collections of personalized contact records, wherein each collection is for one of multiple other users. The server system may compare the received user input to values in fields of the contact records in the repository. The server system may determine the field type by selecting the field type associated with contact records that include a field value that matches the received user input. The repository of contact records may include contact records that the user has identified as acquaintances, to the exclusion of contact records that the user has not identified as acquaintances. The repository of contact records may include contact records for contacts listed in an publicly available electronic database of contacts. The determined field type may be the type of field that is associated with a greatest quantity of values that matches the user input. A machine learning system installed on the server system may be used in determining a matching field type. The display device may present in the display an interface element of selectable field types that displays the matching field type as a selected field type. User correction of the field type using the interface element may be received with the user input interface. The machine learning system installed on the server system may receive the user correction and may update a data set of user corrections to influence future determinations of matching field types to received user input. In response to determining the field type, the display device may present in the display for the particular contact record an interface element of selectable field types that displays the determined field type as a selected field type. Before determining the field type, the display for the particular contact record may not present the interface element with the determined field type as selected. The user input interface of the computing device may receive user input of information that is typed by the user with a virtual or physical keyboard.

Particular embodiments can be implemented, in certain instances, to realize one or more of the following advantages. The features of the described systems and methods can save user time when adding information to a contact record. The number of keystrokes required to create a contact record entry may be reduced. For example, a user may be able to add multiple entries with only the alphanumeric keys of a keyboard and a confirmation key (e.g., the enter key). A user may not need to select a field type for each input value. The need to use a separate peripheral device, such as a mouse, may also be reduced or eliminated.

The existing contact record entries may be displayed with a single input area for creating multiple types of contact record entries, thus saving screen real estate and making it easier for a user to know where to enter data. Also, in some uses of the systems described herein, entries can be generated in any order and arranged by the computing system for display in a predetermined order.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This document generally describes adding information to a contact record. A contact record that is displayed to a user can include a generic input area. The generic input area can be configured to receive user input that does not have an accompanying field type. A computing device can determine a matching field type for the received input, and then present the matching field type to the user, such as by analyzing the syntax of the entry or mapping characters in the entry to various field types. The user can confirm the determined field type or can select a new field type. The user-input and the field type can be stored as a contact record entry, and the generic input area can be cleared for receipt of additional user-input.

Figure 1:
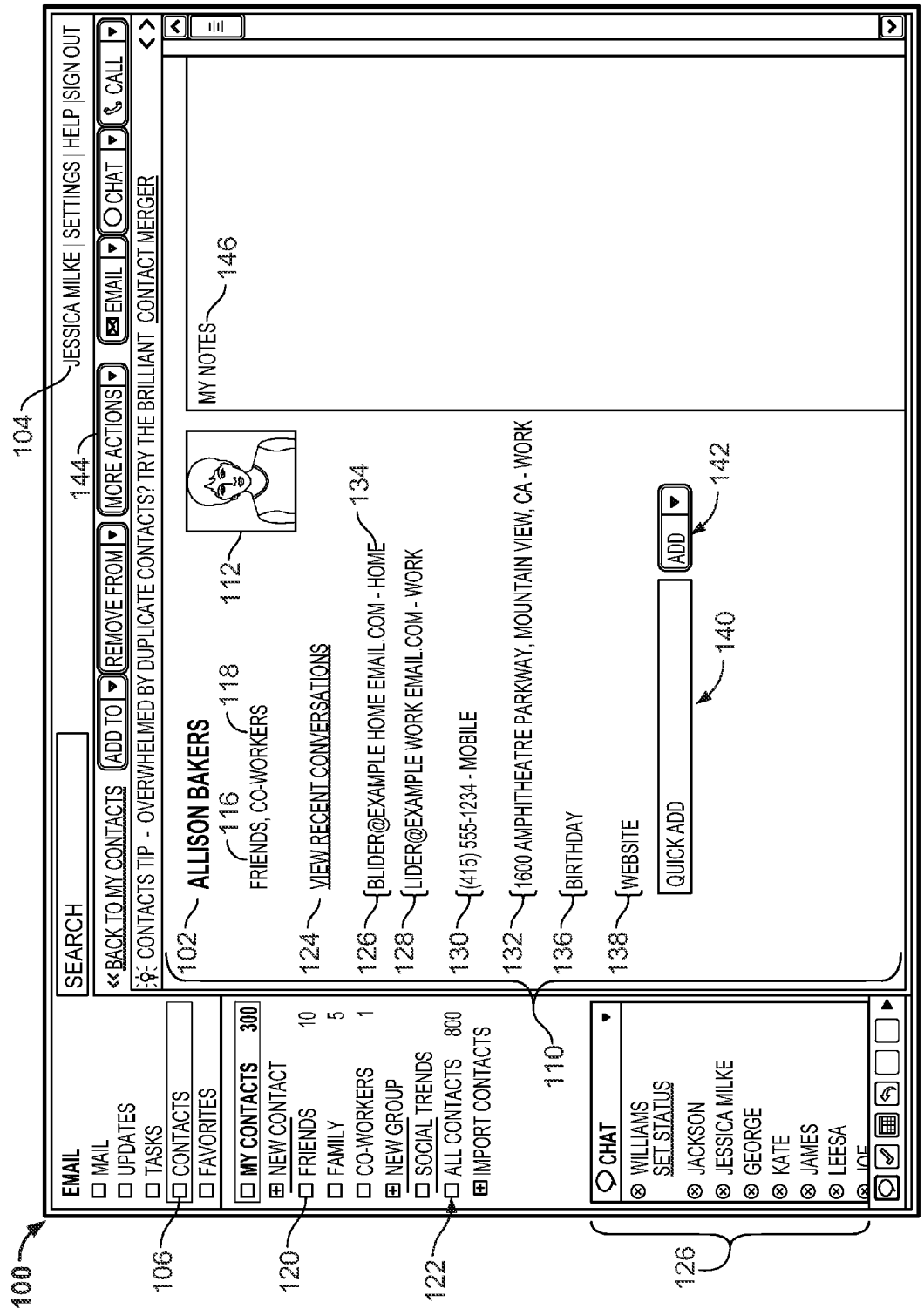
FIG. 1 is a screenshot of a Contact Management system that includes a display of a contact record.

FIG. 1 is a screenshot 100 of a Contact Management System that includes a display of a contact record 110. More specifically, the screenshot 100 is of a web-based email application that includes an "Allison Baker" contact record display 110. The display of screenshot 100 may be presented on a monitor of a computing device and to the user Jessica Milke 104, who has logged into her web-based email application program. The email application enables Jessica to store information on various contacts. For example, the email application may be able to access hundreds of contact records (e.g., contacts for friends of Jessica, business acquaintances of Jessica, and businesses that Jessica frequents).

A listing of all the contact records may be viewed by selecting the "Contacts" link 106. The displayed listing of contacts may not include all the information on each contact. For example, each entry in the listing may only display the name of the contact. From the displayed listing of contacts, Jessica may select a single contact to view additional information stored for the single contact. In this illustration, Jessica has previously selected the entry for Allison Bakers (e.g., by clicking on a link for Allison Bakers' contact record). In response to the selection, the display pane of the email application presents a display 110 for Allison Bakers' contact record.

The contact record display 110 presents information that is associated with Allison's stored contact record. A top portion of the contact record includes Allison's name 102 and a picture of Allison 112. Below Allison's name 102 is a list of tags 114, 116, and 118 that Jessica has assigned to Allison's contact record. For example, Jessica assigned the Friends 116 tag and the Co-workers 118 tag to Allison's contact record. Thus, when Jessica would like to view a list of her contact records that have been tagged as "Friends," she may click the "Friends" link 120.

Selection of the "View recent conversations" link 124 invokes a display of recent conversations between Jessica and Allison, either via email or through a chatting client (e.g., chatting client 126). In some implementations, email conversations and chat sessions with Allison are displayed beneath the contact record display 110.

The display of Allison Bakers' contact record 110 includes several contact record entries. The home email entry 126 displays "blinder@examplehomeemail.com" as Allison's home email address. Allison's work email address 128, mobile telephone number 130, and physical work address 132 are also listed. Each contact record entry includes a value and a field type label. For example, the home email address contact record entry 126 includes the value "blinder@examplehomeemail.com" and is associated with the "Home" field type label 134. The displayed value and field type are stored in memory as part of a contact record entry for Allison Bakers. The contact record display 110 also includes empty records for Allison Bakers' Birthday 136 and Website 138.

The displayed contact record 110 includes a generic input area 140 (e.g., a text box) and an interface element 142 for selecting a field type. The input area 140 is configured to receive from Jessica information for generating an entry for Allison Baker's contact record. The input area 140 can be configured to receive multiple types of information. As an illustration, Jessica may want to add Allison's work telephone number to Allison's contact record entry. Jessica may click on the interface element 142 and select, from a pull down list that appears, "Work telephone Number." Jessica may then click in the input box 140, type the work telephone number, and hit the enter key on her keyboard. Hitting the enter key may store the telephone number as an entry in Allison Bakers' contact record and display the telephone number as a new contact record entry. The input box 140 may clear and interface element 142 may reset as both shift downwards in the display as the new contact record entry is displayed. In some implementations, after selection of the interface element 142, focus for text entry may return to the input box 140 without user selection of the input box 140, reducing the number of mouse clicks needed to enter information. In some implementations instead of hitting the entry key to store the telephone number as a new contact record entry, Jessica need only de-focus the input box (e.g., by clicking on another region of the contact record 110 or of the personal contact management system screenshot 100).

In another illustration, Jessica adds Allison's work telephone number to the displayed contact record, but does not pre-select the "Work telephone Number" field type using the interface element 142. Instead, Jessica clicks in the input area 140 and begins typing Allison's telephone number. The web based email application recognizes that the information that Allison typed in the input area 140 is a telephone number.

The Contact Management System may be configured to store a subtype for each contact record entry. For example, for a contact record entry that includes a "phone number" field type, the subtypes may include "Mobile," "Home," "Work," "Home Fax," "Work Fax," "Pager," and "Other." While the Contact Management System may be able to readily discern that received information is a telephone number, the application may have difficulty determining the subtype of the received information. For this reason, the subtypes may be ranked in an order (e.g., the order presented above), and subtypes may be assigned pursuant to the ranked order. For example, a first determined telephone number may be assigned a "Mobile" field type and a subsequent telephone number may be assigned a "Home" field type. Since Allison's contact record already includes a "Mobile" telephone number, the Contact Management System may assign the "Home" subtype to the telephone number that Jessica types in the input area 140. The temporarily assigned subtype may be displayed as selected by the interface element 142. In certain examples, subtypes may be discernable. For example, in France mobile phones may have a specific prefix. If a telephone number is identified as including this prefix, the "Mobile" subtype may be assigned. Also, if the word "Suite" or "Ste" is followed by a short combination of numbers and/or letters, a "work" subtype may be assigned to an "address" type.

Jessica may see that the Contact Management System correctly determined that the information that she typed is a telephone number, but incorrectly determined that the information is her "Home" telephone number. If Jessica was in a hurry and didn't care if the wrong subtype was stored for the telephone number, she could confirm the determined field type (e.g., by hitting the enter key, or pressing a separate "Confirm" button). Should Jessica have time to correct the subtype, she may do so by selecting the user interface element 142 and changing the subtype for the typed telephone number. Jessica may then confirm the selected field type and subtype, adding the telephone number, selected field type, and subtype to the Allison's contact record. The input area 140 and user interface element 142 may be cleared.

In some implementations, multiple contact record entries may be assigned the same type and subtype. For example, the Contact Management System may allow Allison to manually change the subtype of several telephone contact record entries to "Home." In some implementations, a user may be unable to assign two contact record entries the same type and subtype. Permitting multiple entries to have the same type and subtype may result in difficulties synchronizing contact records between different application programs.

In some implementations, Jessica may provide focus to the input area 140 by clicking in the input area 140, allowing letters typed using a keyboard to appear as input within the input area 140 instead of another portion of the Contact Management System. In some implementations, focus is provided to the input area 140 upon opening the display 110 for Allison Bakers' contact record, and without clicking in the input area 140. In some implementations, the display 110 for Allison Bakers' contact record is shown on a touchscreen device and the input area 140 is provided focus upon tapping an area of the touchscreen where the input area 140 is displayed.

In some implementations, Jessica may edit Allison's contact record entries (e.g., entries 126, 128, 130, and 132) by selecting one of the entries (e.g., by clicking on the entry, tapping on the entry, or selecting an "edit" link next to the entry). Upon activating a displayed entry for editing, Jessica may change the value for each entry and the field type for each entry. In some implementations, a separate edit button or link is provided that activates all of the entries for user editing (e.g., by selecting an "edit" link from the "More Actions" drop down menu 144. The contact record entries may not be editable without receiving user input selecting the "edit" link that activates all entries for editing.

In some implementations, the generic input area 140 is the only means to add a new contact record entry to Allison Bakers' contact record. For example, Jessica may only be able to add an additional contact record entry to Allison Bakers' contact record by typing information in the input area 140. In other words, the contact record display 110 may not include empty entries upon its generation. In this example, the empty "Birthday" 136 and "Website" 138 entries were created using the input area 140 and the interface element 142. Either no information was added into the input area 140 or that information was later deleted from the entries 136 and 138. The Contact Management System may include no tools, buttons, or links in addition to the generic input area 140 and interface element 142 for adding an entry to Allison's contact record. Thus, the same input area (or an instance thereof) is used to create all contact record entries. Only a single empty generic input area 140 may be displayed.

In some implementations, the display 110 of Allisons' contact record entry includes a "My notes" information input area 146. While Jessica may be able to use the input area 146 to enter information into the contact record, the Contact Management System may be unable to assign one of multiple field types to the information. The information may be stored with a single field type (e.g., a "Notes" field type). Subsequent use of the input area 146 may modify the information assigned to the "Notes" field type, not create a new contact record entry.

In some implementations, the Contact Management System illustrated in the screenshot 100 is presented to Allison on a monitor of a local computing device (e.g., a desktop computer, laptop computer, or smartphone). The Contact Management System may be a web-based application where a server system performs a significant portion of the tasks associated with operating the Contact Management System. The local computing device may be primarily used to provide information for display to Jessica and receive user input from Jessica. The server system may provide the local computing device with instructions (e.g., JavaScript code) to execute on the local computing device and reduce execution time for simple tasks. Thus, the local computing device and server system may operate in a client-server relationship.

In some implementations, the Contact Management System illustrated in screenshot 100 is operated as a stand-alone application on a local computing device. The contact records may be stored in memory associated with the local computing device and a network may not be accessed for managing the contact records. The network may be accessed for other functions that are not associated with managing the contact records (e.g., sending and receiving emails).

Figure 2:
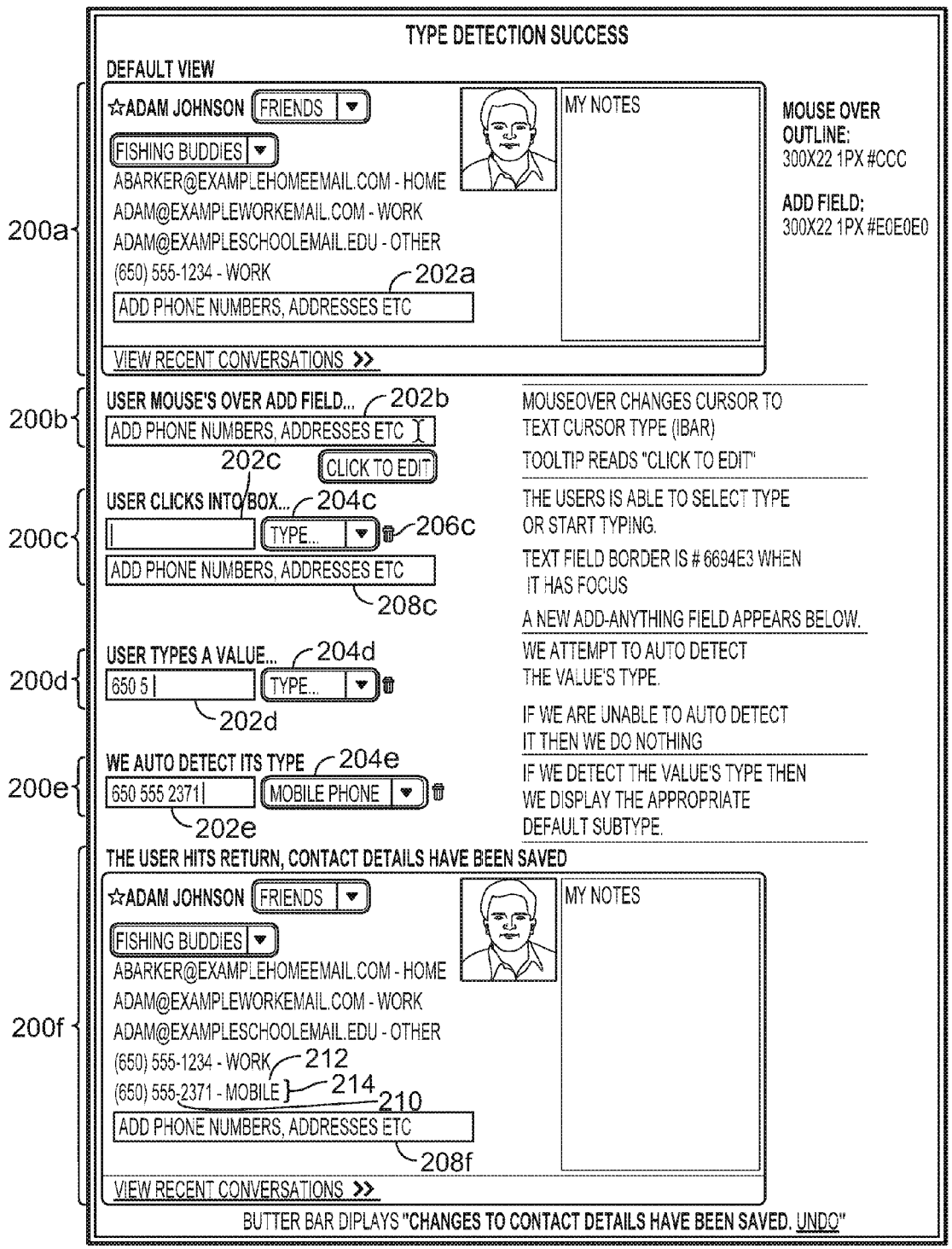
FIG. 2 illustrates multiple steps of a successful field type detection.

FIG. 2 illustrates multiple steps of a successful field type detection. More specifically, FIG. 2 illustrates a user-input of information into a generic input area and a successful recognition that the entered information is a mobile telephone number. The contact record displayed in step 200*a* is similar to the contact record 110 of FIG. 1. Adam Johnson's contact record includes "home email," "work email," "other email," and "work telephone number" entries. The generic input area 202 includes an overlay of grey text that prompts a user to "Add telephone numbers, addresses etc." In this example, the empty generic input area 202*a* is not associated with an interface element for selecting a field type.

In step 200*b*, a user moves his mouse over the generic input area 202*b*. The mouseover changes the cursor type and a small "tooltip" box appears with the cursor and provides assistance to the user. In this example, the tooltip box includes the text "Click to edit."

In step 200*c*, the user clicks in the box. Upon clicking in the box, the grey text disappears and the user interface element 204*c* appears. User interface element 204*c* is similar to interface element 142 and is configured to display a determined field type for information entered into the input box 202*c*. In this illustration a new generic input area 208*c* appears upon the selection of the input area 202*c*. Also, a "delete" icon 206*c* appears and allows the user to remove the input area 202*c* and the interface element 204*c* from display. In essence, because a new generic input area 208*c* appears, if the user wishes to start over and enter different information, he may do so by deleting the existing input area and interface element and starting anew. In some implementations, the additional generic input area 208c may not appear upon the user selecting the input area 202c. A cleared generic input area 208c may only appear upon a user hitting return or clicking elsewhere in the contact record (as discussed below).

In step 200d, the user types information into the generic input area 202d. If the computing system is able to determine a field type that matches the typed information, the interface element 204d may be modified to display the determined field type. The determined and displayed field type may change as the user enters more information into the input area 202d. If the computing device is unable to determine a field type, the interface element 204d can remain in a non-assigned state.

In step 200e, the user has typed additional information into the generic input area 202d. The computing system has determined that the typed information matches a telephone field type and a mobile subtype. The type determination may be performed repeatedly as the information in the generic input area is modified.

In step 200f, the user has confirmed the displayed type and subtype of the information by pressing enter. A text display 210 of the information that was in the generic input area is added to the contact record display, along with a label 212 indicating the subtype of the contact record entry. In some implementations, the generic input area 202 is removed from display and the additional generic input area 208f that was created in step 200c remains in the display. In some implementations, no additional generic input area 208c is created in step 200c. In these implementations, the new generic input area 208f appears after the user confirms the type detected in step 200e (e.g., by hitting the "enter" key). The new generic input area may be created by generating a new input area or clearing the existing input area.

In some implementations, when auto-detection is performed, the type and subtype is shown (e.g., as in interface element 204d), but when the type and subtype are confirmed, an abbreviation of the field type and subtype may be shown (e.g., as with label 212). The full type may initially be shown to avoid confusion (e.g., as only "home" could refer to either a home address or a home phone). However, once the user has confirmed the field type, the use of the label "home" along with either an address or a telephone number may be sufficiently clear to a user.

Figure 3A:
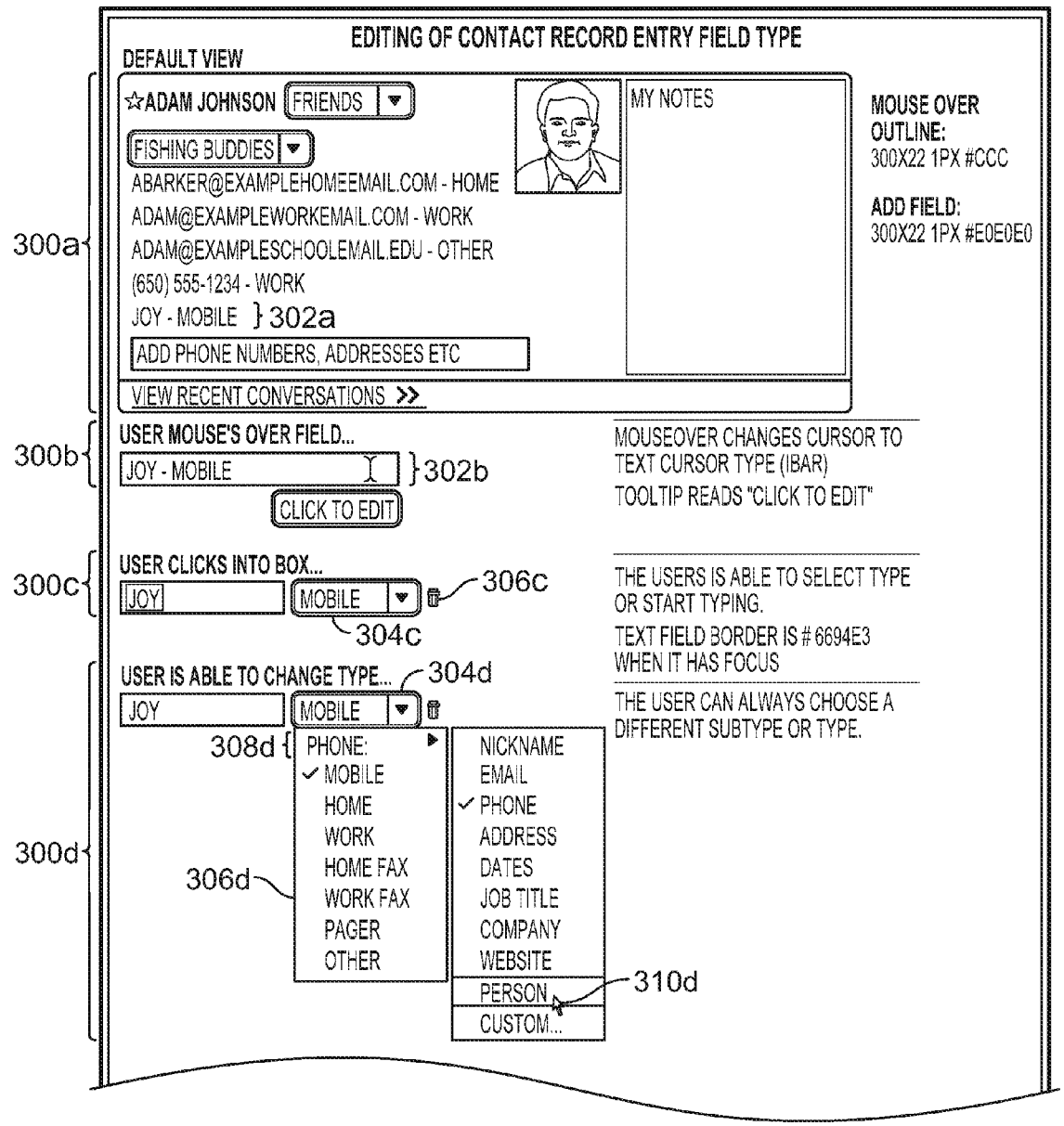
FIGS. 3A-B illustrate multiple steps for editing a contact record entry field type.
Figure 3B:
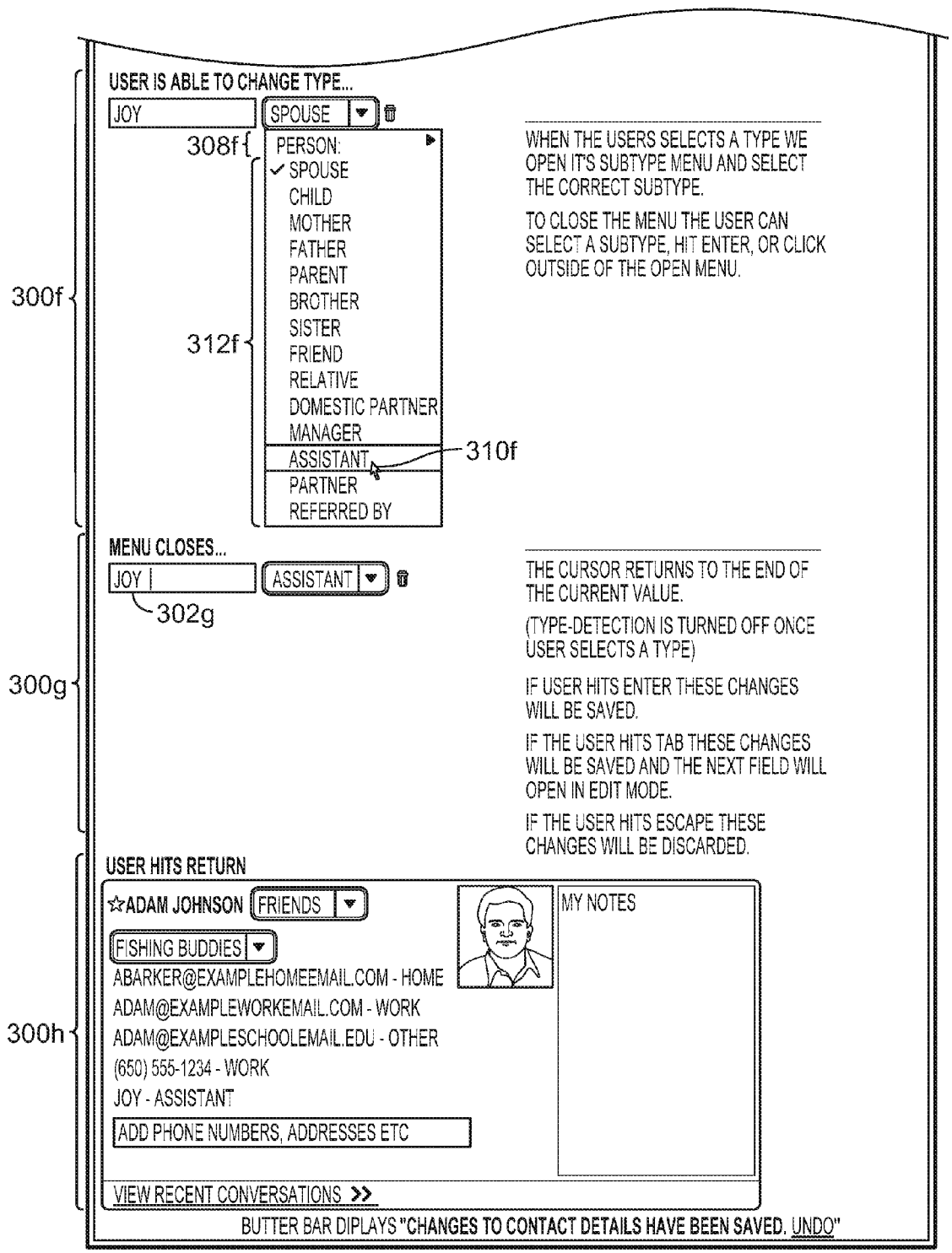

FIGS. 3A-3B illustrate multiple steps for editing a contact record entry field type. The contact record illustrated in step 300a includes a contact record entry 302a that includes a value "Joy," a field type of "Phone," and a subtype of "Mobile" (referred to, in short, as a field type of "Mobile Phone"). In this example, a user realizes that "Mobile Telephone" is not the appropriate field type for "Joy." The following steps illustrate an example sequence for user-modification of the field type.

In step 300b, the user moves his mouse over the contact record entry 302b. The value "Joy" is not yet editable but a box appears around the contact record entry 302b, the cursor changes, and a tooltip that states "Click to edit" appears.

In step 300c, the user clicks in the box and the value "Joy" is selected for editing. Also, an interface element 304c appears and allows modification of the incorrect field type. A trash can icon 306c also appears.

In step 300d, the user has selected the interface element 304d. In response to the selection, a drop down list appears below the initial display of the interface element 306d. The presently selected field type 308d is displayed at the top of the drop down list and the subtypes for the selected type 308d are displayed below the selected field type 308d. The user can modify the subtype by selecting a different subtype. Also, a user can modify the type by selecting the presently selected type 308d, which presents a list of the field types available for selection by the user. In this illustration, the user has moved the mouse cursor 310d over the "Person" type.

In step 300f, the user has selected the "Person" type, causing "Person" to appear as the presently selected type 308f and invoking a display of subtypes 312f for the "Person" field type. The user has moved the mouse cursor over the "Assistant" subtype.

In step 300g, the user has selected the "Assistant" subtype. Thus, the interface element 304g displays "Assistant" and focus returns to the generic input box 302g (e.g., so that a last name may be typed for the assistant's name or so that the user may confirm the field type).

In step 300h, the user has confirmed the value "Joy" and the field type "Person: Assistant," for example, by hitting the enter or tab keys. The new field type is stored for the Adam Barker contact record and appropriately presented in a display for the contact record.

In some examples, the contact record 302a included an incorrect field type because the computer process for identifying a field type performed an inaccurate match. In other examples, the user mistakenly used the interface element to set a "Mobile Telephone" field type for "Joy."

Figure 4A:
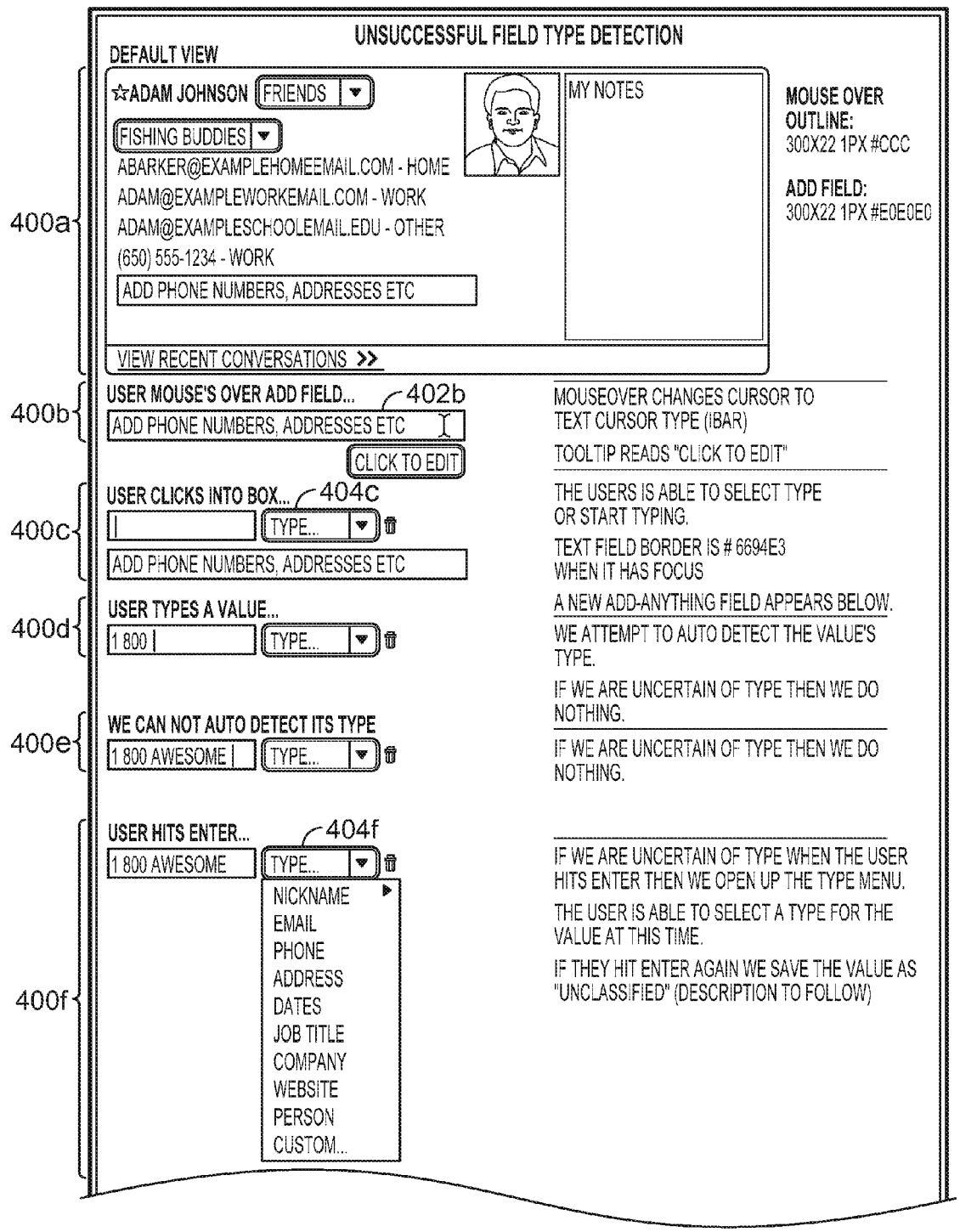
FIGS. 4A-B illustrate multiple steps of an unsuccessful field type detection.
Figure 4B:
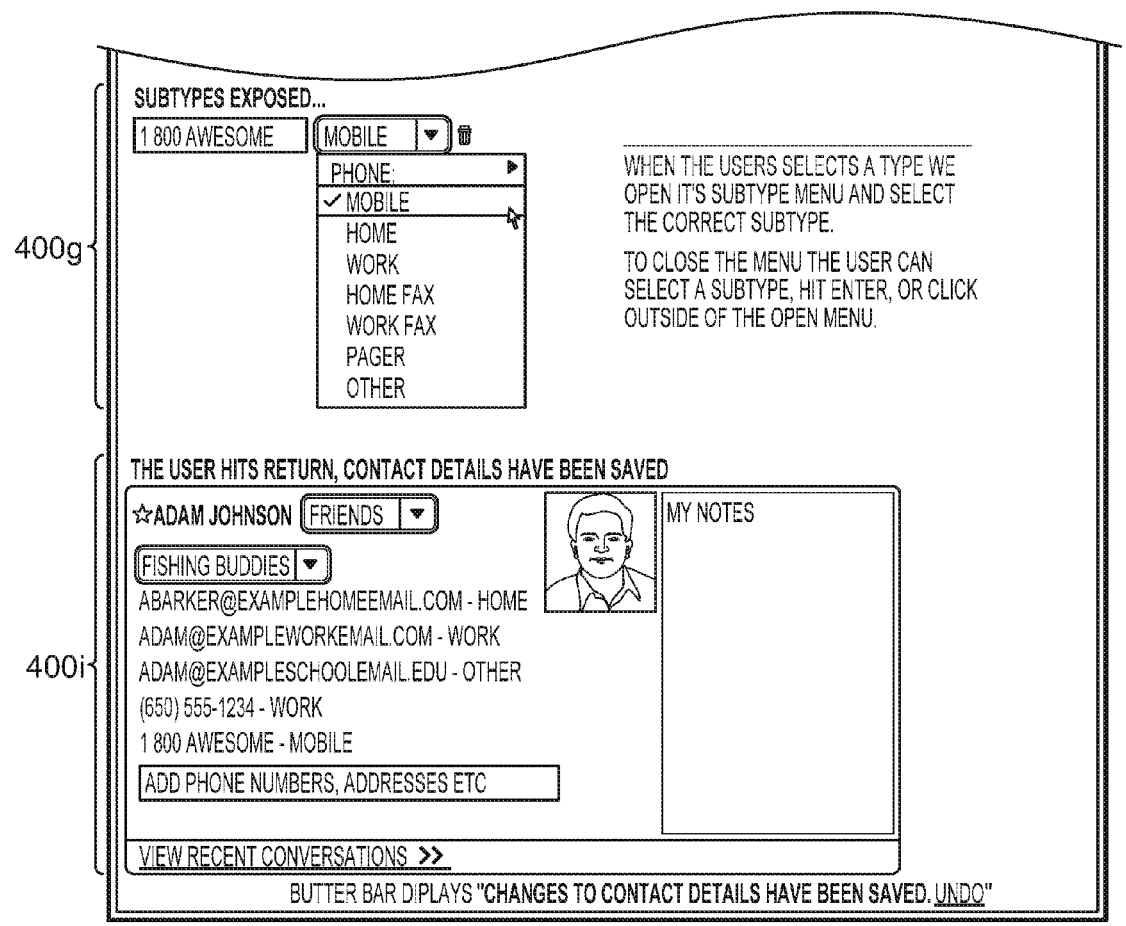

FIGS. 4A-B illustrate multiple steps of an unsuccessful field type detection. More specifically, FIGS. 4A-B illustrate the user-input of a telephone number into a generic input area and an unsuccessful recognition that the entered information is a mobile telephone number. The contact record displayed in step 400a is similar to the contact record displays 110, 200a, and 300a. In this illustration, the user moves his mouse over the generic input area 402b (step 400b) and clicks in the input area 402b, activating an empty input area and invoking the display of the interface element 404c (step 400c).

The user types the telephone number "1 800 AWESOME" into the generic input area 402d (step 400d), but the Contact Management System is unable to determine a type for the entered information. If the user performs a confirmation when a type has not been determined (e.g., by hitting an enter key), the drop down menu for the interface element 404f may pop open. A user can select one of the types or subtypes from the interface element (step 400f). If the user again presses the enter key without having selected a type, the entered information can be stored in a contact record entry that is associated with an "unclassified" field type. In step 400g, however, the user selects the "Mobile" subtype, resulting in the display illustrated in step 400i. In some implementations, the mobile Contact Management System is able to determine a "Telephone" field type for telephone numbers that include alphabetic characters.

Figure 5:
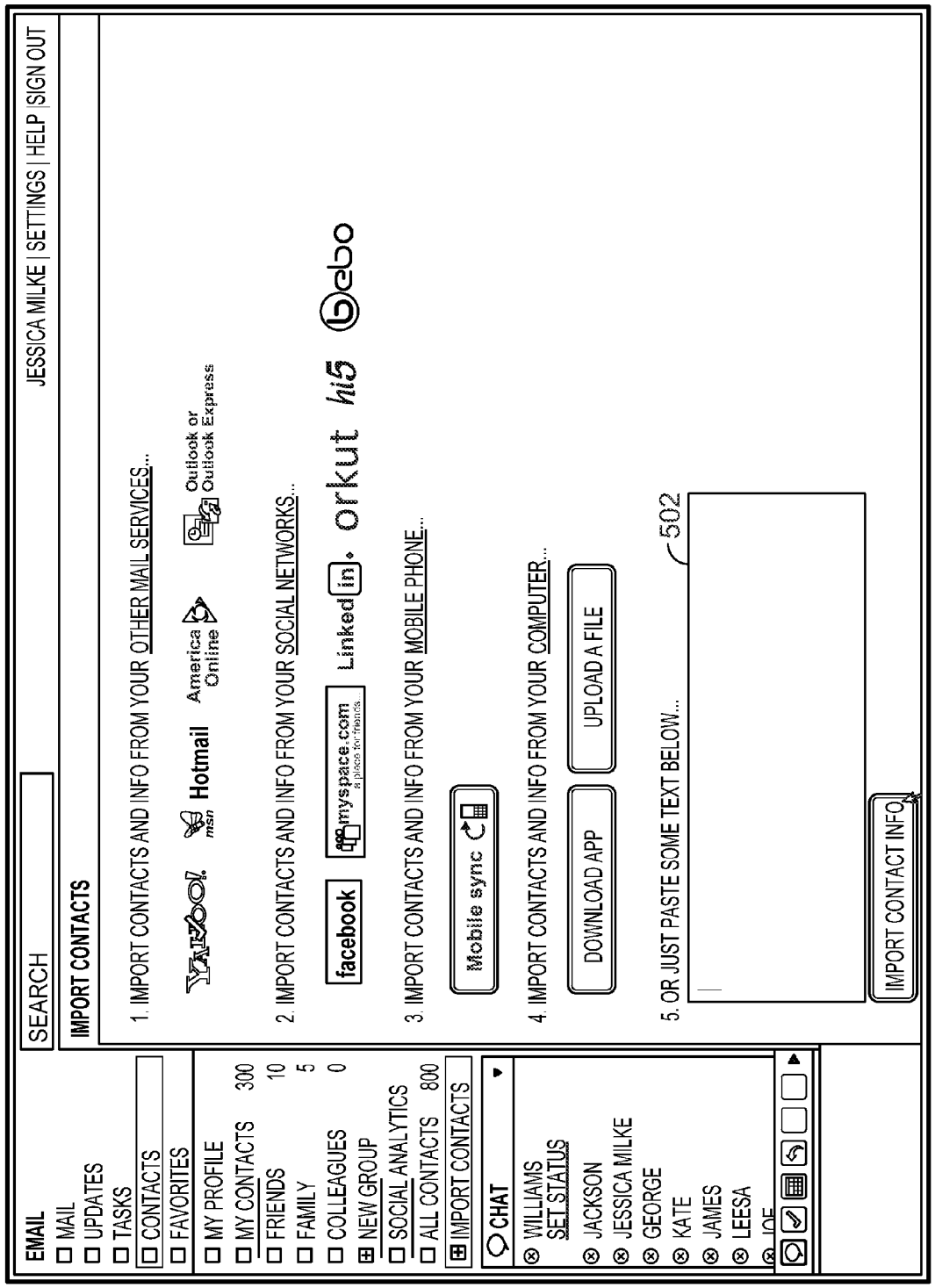
FIG. 5 is a screenshot of a display for importing contact records.

FIG. 5 is a screenshot of a display for importing contact records. More specifically, FIG. 5 is a screenshot 500 of a contact import page for a web-based Contact Management System. The page illustrates five different mechanisms for importing contacts (i.e., retrieving additional contacts or contact information from other repositories of contact information). For example, a user may: (1) import contacts from other mail services, (2) import contacts from a social network, (3) import contacts from a mobile telephone, (4) import contacts from a file stored on the computing device, and (5) import contacts by entering text in the generic input area 502.

In some implementations, the imported file that is received by the Contact Management System in connection with the use of option (4) is formatted and includes tags that identify a type of each portion of information. In other words, the file includes field types for each contact record entry. In other implementations, the imported file includes data for a plurality of contacts, but does not include identifying field types for each contact record entry. In these implementations, the web-based Contact Management System can parse through the content of the imported file and identify a field type for each contact record entry. Mechanisms similar to those used to identify a field type for information entered into the generic input area of FIGS. 1-4 can be used. Where a type cannot be determined the user can be prompted to identify a type.

In some implementations, the generic input area 502 used in connection with option (5) enables a user to type or paste in large blocks of information about one or more contacts, assign field types to each portion of the information, and generate or update contact record entries based on the received information. For example, a user may enter the text "Joe Milke, (555) 555-4322, jmilke@exampleemail.com, Bill Martins, (555) 555-1422, 14 S. 2nd Street, Marks Ribs. The Contact Management System may parse through entered list, chopping the block of information into smaller portions that each represent a value for a contact record entry. The web-based Contact Management System may determine, for each value, a field type for the value. After the entire list has been parsed, the user may be presented with a display of values for which the application could not determine a matching field type. Each value may be accompanied by an interface element for selecting a field type. For example, the Contact Management System may prompt the user to specify a type of information for the value "Marks Ribs."

Figure 6:
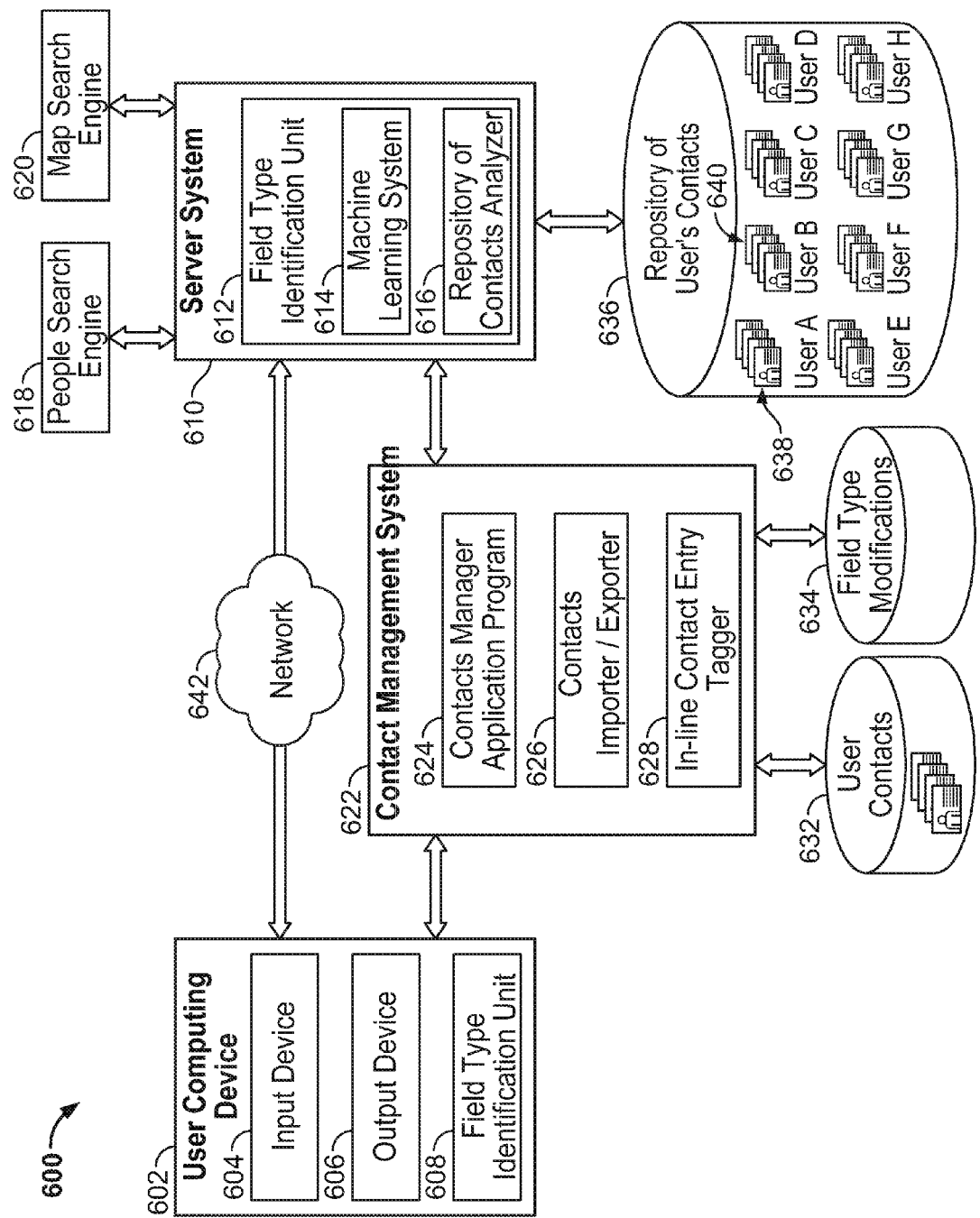
FIG. 6 is an illustration of an example system for adding information to a contact record.

FIG. 6 is an illustration of an example system for adding information to a contact record. The system 600 includes a user computing device 602 that is networked to server system 610. A user interacts with a Contact Management System 622 using the user computing device 602. The Contact Management System 622 may be stored or executed from the user computing device 602, remotely from the server system 610, or across both devices.

A contacts manager application program 624 accesses contact records 632 for the user and provides functions that enable the user to add and edit information for a particular contact record. The contacts manager 624 can receive information that has not been classified with a field type and the field type identification units 608 and 612 can determined a field type for the information. The server system 610 may access a people search engine 618, a map search engine 620, and a repository of users' contacts 636 to assist the determination of the field type.

Now describing system 600 in more detail, user computing device 602 may be a desktop computer, a laptop computer, a netbook, a mobile telephone, or a smart telephone. The input device 604 receives input from a user and may be a physical keyboard, a mouse, a touchpad, or a touchscreen. The output device 606 presents a display of information to the user and may be a display device (e.g., a monitor, projector, or a touchscreen display device).

The user may access the Contact Management System 622 using the computing device 602. The Contact Management System 622 may be included as part of an email application that may allow the user to send electronic messages to other persons' email accounts and receive emails from the these other persons. In some implementations, the Contact Management System may be stored and operate from local memory in the user computing device. The user may be able to access the Contact Management System (and contacts associated with the Contact Management System) without connecting the user computing device 602 to a network. In some implementations, the Contact Management System is stored in memory accessible to the server system 610 and not stored locally on the user computing device 602. The user may access the Contact Management System 622 through a web browser operating from local memory of the computing device 602. The server system 602 may serve the Contact Management System 622 to the user computing device 602 over a network 642 as a web page.

The Contact Management System 622 is associated with a contacts manager application program 624. The contacts manager 624 may allow the user to view and edit information for any of multiple contact records 632 stored for the user (e.g., stored for a particular user account that the user has logged into). Each contact record may be associated with a single contact (e.g., a single person or a single business). Each contact record may be configured to store multiple different contact record entries. Each contact record entry may include a value and a field type. The value is data that describes a characteristic of the contact. The field type is data that describes a meaning of the value. The value can include text, a picture, a file, a widget, a sound clip, or a video.

The contacts manager application program 624 presents to the user a list of the user contacts 632. The list of user contacts 632 may display, for each contact record, partial information for the contact record. The user may select a contact record for display and the contacts manager 624 may present on the output device 606 a window that includes information for the selected contact record (e.g., the name and contact record entries). Example displays of contact records are illustrated in FIGS. 1-5. The contacts manager 624 may enable the user to add contact record entries to a contact record, as described throughout this document.

The field type identification unit 608 can determine a matching field type for data entered by the user as a new contact record entry or an edit to a contact record entry. The field type identification unit 608 can perform the identification by analyzing the content of the entered data. The analysis can be performed using algorithms that are executed by a processor coupled to the user computing device. For example, if the Contact Management System 622 is a web-based email program, the server system 610 may transmit JavaScript field-type determination algorithms to the user computing device 602. In some implementations, the algorithms that analyze the content of the entered data are performed on a separate field type identification unit 612 of the server system 610. The described algorithms may determine the type of the data based on heuristics embodied within the algorithm and without using an external data set of contact information. The heuristics are described in more detail with connection to FIG. 7.

In some implementations, in addition to or instead of analyzing the data with the above described algorithms, the server system 610 uses a machine learning system 614 to identify a field type for the data. The machine learning system 614 can receive as input the data and output a matching field type. The machine learning system can be trained from a repository of users' contacts 636. The repository 636 may include contact records or contact record entries that are stored for multiple other users. For example, the machine learning system 614 may be trained on multiple sets of contact records, each set of contact records associated with a different user account of the web-based email system. To protect the confidentiality of users of the web-based email system, the repository 636 may not identify a user account that each contact record was obtained from. Also, names of the contacts in repository 636 may be removed or contact record entries may not be associated in groups that correspond to contact records.

Additionally, the machine learning system 614 can be trained from a repository of field type modification 634. The repository of field type modifications 634 can include a data set that identifies contact record entries for which the field type identification unit 608 or 614 incorrectly identified the field type (as determined by user-feedback that changed the field type). The data set can include—for each contact record entry—the value, the determined field type, and the user-modified field type. The field type modifications 634 may be particularly relevant because the modifications illustrate instances where the machine learning system may have provided an incorrect match.

In some implementations, the server system 610 uses a repository of contacts analyzer 616 to identify a field type for the data. The contacts analyzer 616 can determine a field type that matches a user-entered value based on identifying similar information in contact records of other users. As an illustration, suppose that John was adding a contact record entry for his friend Adam's telephone number. John enters the telephone number (555) 555-1234 into a generic input area of the contact record for Adam. The field type identification unit 608 may be able to determine that the entered value is a telephone number field type, but cannot determine a subtype.

The user computing device 602 can provide the entered telephone number to the contacts analyzer 616 of the server system 610. The contacts analyzer 616 may traverse the repository 636 of contact records for other users. Five contact record entries in the repository 636 may include the same entered telephone number. Of the five entries, four may be associated with a "Mobile" telephone subtype and one may be associated with a "Home" telephone subtype. Since the "Mobile" subtype is the most common match, the "Mobile" subtype may be transmitted to the user computing device 602 as a matching subtype.

In some implementations, the contacts analyzer traverses the repository 636 for values from other of entries in Adam's contact record. As an illustration, Adam's contact record may already include his email address "adam@exampleemail.com," and physical address "1234 5th Street." The contacts analyzer 616, in addition to, or instead of searching for the entered telephone number, may search the contacts in the repository 636 for contact records that include the name "Adam," the email address "adam@exampleemail.com," and the physical address "1234 5th Street." A contact record may be identified as matching if one or more of the field are the same.

From the matching records, an appropriate field type for the entered information may be determined. For example, if the field type of the entered information is determined to be a telephone number, subtypes for the determined telephone number may be excluded for consideration if the subtypes are assigned to different telephone numbers in the matching records. An ordered list of default subtypes may be referenced to determine the matching field type from the remaining subtypes that are available.

In some implementations, the entered information may only be compared against matching records. As an illustration, an entered value of "The Plaza" may correspond to a building where people both work and live. If the repository 636 was searched for "The Plaza," a field type associated with matching entries may be ambiguous and provide no clear match. However, by first identifying matching records (i.e., records that likely identify the same contact), a search for among the matching records for entries that include the value "The Plaza" will more likely return the correct field type. In some implementations, the repository of user contacts 636 is a list of contacts pulled from a social networking site.

In some implementations, the server system 610 uses a map search engine 620 to determine a type for a received value. For example, the server system 610 may provide a user-entered value to the map search engine 610, and the map search engine 610 may determine if the entered value corresponds to a real-world physical address. Using an existing map search engine can be beneficial because map search engines may be trained to recognize non-standardized address queries. Leveraging existing data sets can be most effective and cost efficient.

The server system 610 can also use a people search engine 618 to determine a type for a received value. The people search engine may include a database of information about individuals and the server system 610 may query the database to identify a field type in a manner similar to the analysis performed by the contacts analyzer 616 of the repository of user contacts 636. In some implementations, a value is provided to the people search engine and the people search engine identifies any potential matches for the data. For example, the value "(555) 555-1234" may be provided to the people search engine. The search engine 618 may be unable to identify a person with the entered value, unable to identify an address with the entered value, but may be able to identify a telephone number for the entered value. In some implementation, an match is verified by comparing other information in the contact record against information in the people search engine that is associated with the matching telephone number.

The Contact Management System 622 can include a contacts importer and exporter 626. The importer and exporter can provide the user contacts 632 to a different contacts management application program or store the user contacts 632 to a file. Also, the importer and exporter 626 can retrieve contact records from a file or another application program and add them to the list of user contacts 632. If the imported contact records do not contain field types for information, or contain field types that are not recognized by the Contact Management System 622, the field type identification units 608 and 610 can perform an identification of a field type for values in imported contact record entries.

In some implementations, the Contact Management System includes an in-line contact entry tagger 628. The contact entry tagger 628 allows a user to assist the field type identification units by entering field type tags into the input area. As an illustration, a user may type "(555) 555-1234 telephone" into a generic input area. The contact entry tagger 628 may identify the word "telephone" as a potential tag from a list of reserved tags. Based on the identified tag, the entered text may be automatically assigned the "Telephone" field type, or the "Telephone" field type may be given a greater weight in the analysis performed by the field type identification units 608 and 612.

Tags may be especially helpful with subtypes. For example, a user may type "billy@exampleworkemail.com work" into the generic input area, facilitating the user selection of the "Work" subtype for the email field type. The tags may be a set of reserved words. In some implementations, a trigger is used to identify a tag. For example, the tag may be surrounded by two "#" symbols or may be in all capital letters. In some implementations, the contact entry tagger 628 only looks to the first or last word of the typed information for a tag.

Figure 7:
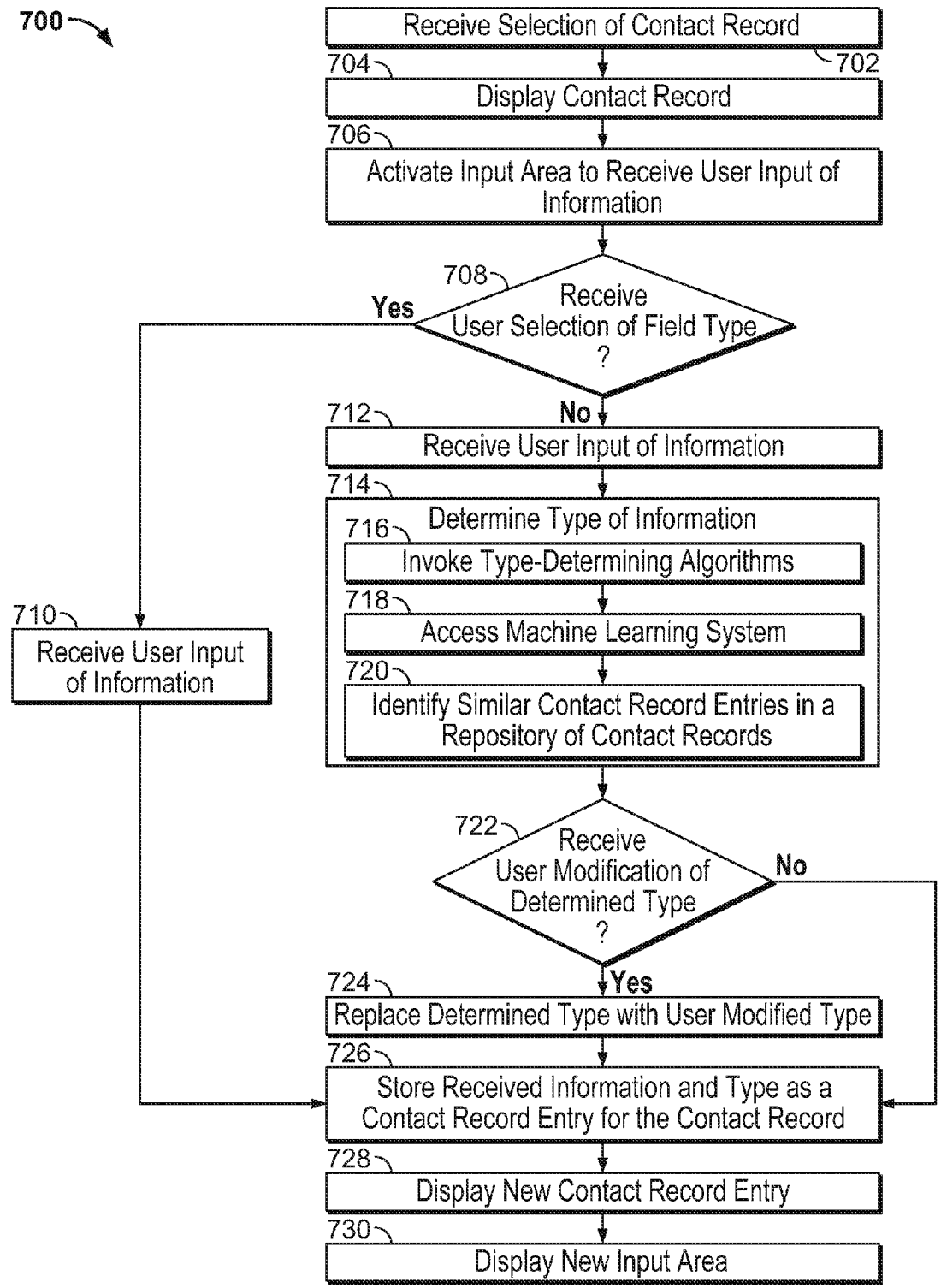
FIG. 7 is a flow chart of an example process for adding information to a contact record.

FIG. 7 is a flow chart of an example process 700 for adding information to a contact record. The process 700 may be performed, for example, by a system such as the system in FIG. 6 and, for clarity of presentation, the description that follows uses the system in FIG. 6 and the illustrations of FIGS. 1-5 as the basis of an example for describing the process. Another system or combination of systems, however, may be used to perform the process 700.

In box 702, selection of a contact record is received. For example, an Contact Management System 622 may receive a user-selection of a contact record from a plurality of contact records. In some implementations, a list of contact records is presented on the output device 606 to a user. The user selects one of the contact records from the list using the input device 604.

In box 704, the selected contact record is displayed to the user. For example, the contact record can be displayed on the output device 606 of the computing device 602. Example contact record displays are depicted in FIGS. 1-4. The displayed contact record can include a generic input area. The generic input area can be configured for user generation of contact record entries that are of multiple types (e.g., an address entry or a telephone number entry). In some implementations, the contact record display only depicts information for the selected contact record and does not depict information for other contact records. In some implementations, the contact record display depicts all entries stored for the contact record. Each entry can include user-supplied information relevant to a contact associated with the contact record.

In box 706, an input area is activated to receive user input of information. For example, the generic input area 202c may be activated to receive user input upon the user selecting the input area 202c with the mouse cursor. The input area may visibly indicate that it is activated by providing a blinking cursor within the input area. In some implementations, the input area is activated upon the user selecting the contact record for display from a list of displayed contact records. For example, upon selection of a contact record from a list of contact records, the contact record may be displayed with focus initially provided to the generic input area. Should the user begin typing—without having provided any user input subsequent to the contact record selection—the typed text may appear in the generic input area.

In box 708, a determination is performed whether user selection of a field type is received. As an illustration, a user viewing the screen 100 may select the user interface element 142 and select a field type for information entered into the generic input area 140. The field type may be selected before user-input of information in the generic input area 140 is received. If user selection of a type is received, the process proceeds to box 710. If user selection of a type is not received, the process proceeds to box 712.

In boxes 710 and 712, user input of information is received in the activated input area. For example, a user may type a string of text characters, and the text characters may be displayed in the input area. In some implementations, the input area is a text box. In some implementations, the input area can receive multimedia information (e.g., a picture, a video, a sound clip, a file, a chart, a graph, a widget, etc.).

In box 714, a field type of the received information is determined. The field type can be selected by a computer algorithm from a list of pre-existing field types. Each field type in the list can identify the semantics (e.g., the meaning) of the received information. The determination of the type can be performed by a user computing device 602 alone or in communication with a server system 610. In some implementations, the determination is performed in response to receiving the information and without a supplied user indication of the type. The determined field type may be displayed to the user in the contact record display. Box 714 may the operations of include boxes 716, 718, or 720.

In box 716, type-determining heuristics are invoked. Each heuristic may determine whether the received information satisfies criteria for associating the received information with a specific field type. Example heuristics for each of multiple field types are described in turn.

Received information may be determined to match an "Email Address" field type if: (1) the information includes an "@" symbol, (2) the information does not include any spaces, or (3) the information terminates with a top-level domain (e.g., .net, .com, .edu, .gov, .mil, and .org). One or more of the described heuristics may be used alone or in combination to determine a match for an email address field type.

Received information may be determined to match a "Telephone Number" field type if: (1) the received information comprises only the characters 0-9 (,), ., and -; (2) if all punctuation is removed from the received information and only numbers remain; (3) if the received information includes a determined quantity of numbers that matches the amount of numbers for a regional telephone call; or (4) if the received information begins with an international dialing extension (e.g., 011 or +). One or more of the described heuristics may be used alone or in combination to determine a match for a telephone number field type.

Received information may be determined to match a "Date" field type if: (1) the information includes 4-8 digits, (2) the information includes two "-" symbols, (3) the information includes two "/" symbols, or (4) the information includes a month name or abbreviation. One or more of the described heuristics may be used alone or in combination to determine a match for a date field type.

Received information may be determined to match an "Address" field type if: (1) the information includes a state name or a state abbreviation, or (2) the information includes spaces between different sets of non-space characters. One or more of the described heuristics may be used alone or in combination to determine a match for an address field type.

Received information may be determined to match a "Website" field type if: (1) the information begins with "www," "http," or "ftp;" (2) the information does not include any spaces; the information does not include an '@' symbol; or (4) the information terminates with a top-level domain. One or more of the described heuristics may be used alone or in combination to determine a match for a website field type.

Table 1 presents example code that applies multiple heuristics to a received user-input of information. Regular expressions may be found within some of the function calls.

TABLE 1

Example Algorithms for Performing a Type-Determination

```
ContactItem.clasifyType = function(str) {
  str = $.trim(str);
  if (str.match(/ \w+@\w+\.[\w\.]+$/)) {
    return ContactItem.type.EMAIL;
  }
  if (str.match(/[\d-\s\.\+\(\)]{7,}/)) {
    return ContactItem.type.PHONE;
  }
  // keywords indicating address
  if
(str.match(/\b(street|st|road|rd|ave|av|avenue|parkway|pkwy|blvd|po|p\.o\.|box)\b/i)) {
    return ContactItem.type.ADDRESS;
  }
  // a word, then state codes
  if
(str.match(/\w+.*\b
(AL|AK|AS|AZ|AR|CA|CO|CT|DE|DC|FM|FL|GA|GU|
HI|ID|IL|IN|IA|KS|KY|LA|ME|MH|
MD|MA|MI|MN|MS|MO|MT|NE|NV|NH|NJ|NM|NY|NC|ND|MP|OH|OK|
OR|PW|PA|PR|RI|
SC|SD|TN|TX|UT|VT|VI|VA|WA|WV|WI|WY)\b/i)) {
    return ContactItem.type.ADDRESS;
```

TABLE 1-continued

Example Algorithms for Performing a Type-Determination

```
}
// a word, then zip codes
if (str.match(/\w+.*\b\d{5}/)) {
    return ContactItem.type.ADDRESS;
}
// start with numbers, then a word
if (str.match(/^\d{2,5}\s+\D+/)) {
    return ContactItem.type.ADDRESS;
}
return ContactItem.type.UNKNOWN;
}
```

The example code in Table 1 may be for the United States only. Separate code segments may exist for different countries. In some implementations, code for a country associated with the user's country is used. The user's country may be identified as a home address of the user as stored in association with the user's account, a location of the IP address for the user, or a country associated with a majority of the user's contact records. In some implementations, if a match is not found that is associated with the user's country, algorithms associated with some or all of the other countries are invoked to identify potential matches for naming conventions associated with other countries.

Additional heuristics for determining a type of information may be known to those skilled in the art, and for simplicity are not detailed herein. In some implementations, the heuristics identify within the received information certain characters or an ordering of certain characters. In some implementations, the algorithms do not access an external data set of contact record entries.

In box 718, a machine learning system is accessed. The machine learning system may receive as input the received information and may output a field type matching the information. The machine learning system may be trained on a set of contact record entries that include values and associated field types. In some implementations, the machine learning system is trained with a data set of user corrections to field types that the machine learning system initially determined as matching values.

In box 720, similar contact record entries are identified from a repository of contact records. The repository of contact records can include contact records from friends in a social network (e.g., a user's friends, a user's friends of friends, or a user's friends of friends of friends) or from other users of a web-based email system. In some implementations, the repository is searched to locate contact record entries that are the same or substantially the same as the received information. The most prevalent field type for the located contact records may be identified as the matching field type.

In box 722, a determination is made whether user modification of a determined field type is received. For example, the user computing device 602 may determine that the information "500 Club" matches the address field type. The determined field type may be displayed to a user and the user may realize that "500 Club" is the name of a contact's place of work. The user may modify the determined field type using a field type selection unit 142. If the user has modified the determined field type, the operations of box 724 are performed. If the user has not modified the determined field type, the operations of box 726 are performed.

In box 724, the determined type of field type is replaced with the modified field type. For example, the user may select the "Place of Business" field type for the "Hobbies @ The Gallery" information, overriding the computing device's determined field type of "email." The modified field type may be depicted in the contact record display.

In box 726, the received information and the field type is stored for the contact record. For example, upon receiving user confirmation of the field type (e.g., by hitting the enter key) or user modification of the field type, the received information and field type may be stored as a new contact record entry within the stored contact record. A contact record may be stored as a data structure in memory. In some implementations, the data structure reserves empty fields for the addition of new contact record entries. In some implementations, new memory is allocated to the data structure for an addition of a new contact record entry.

In box 728, the new contact record entry is displayed. For example, the information received within the input area and the field type for the received information can be added to the contact record display. As an illustration, contact record entry 214 in FIG. 2 illustrates the contact record entry displayed after receiving the value 210 and displaying the field type with interface element 204e.

In box 730, a new input area is displayed. For example, the input area in which the information was received may be cleared. In some examples, the input area may be removed and replaced with a new instance of an input area. Along with the display of a new input area, the interface element for displaying and selecting field types may be removed from display, or cleared to a non-assigned state.

Figure 8:
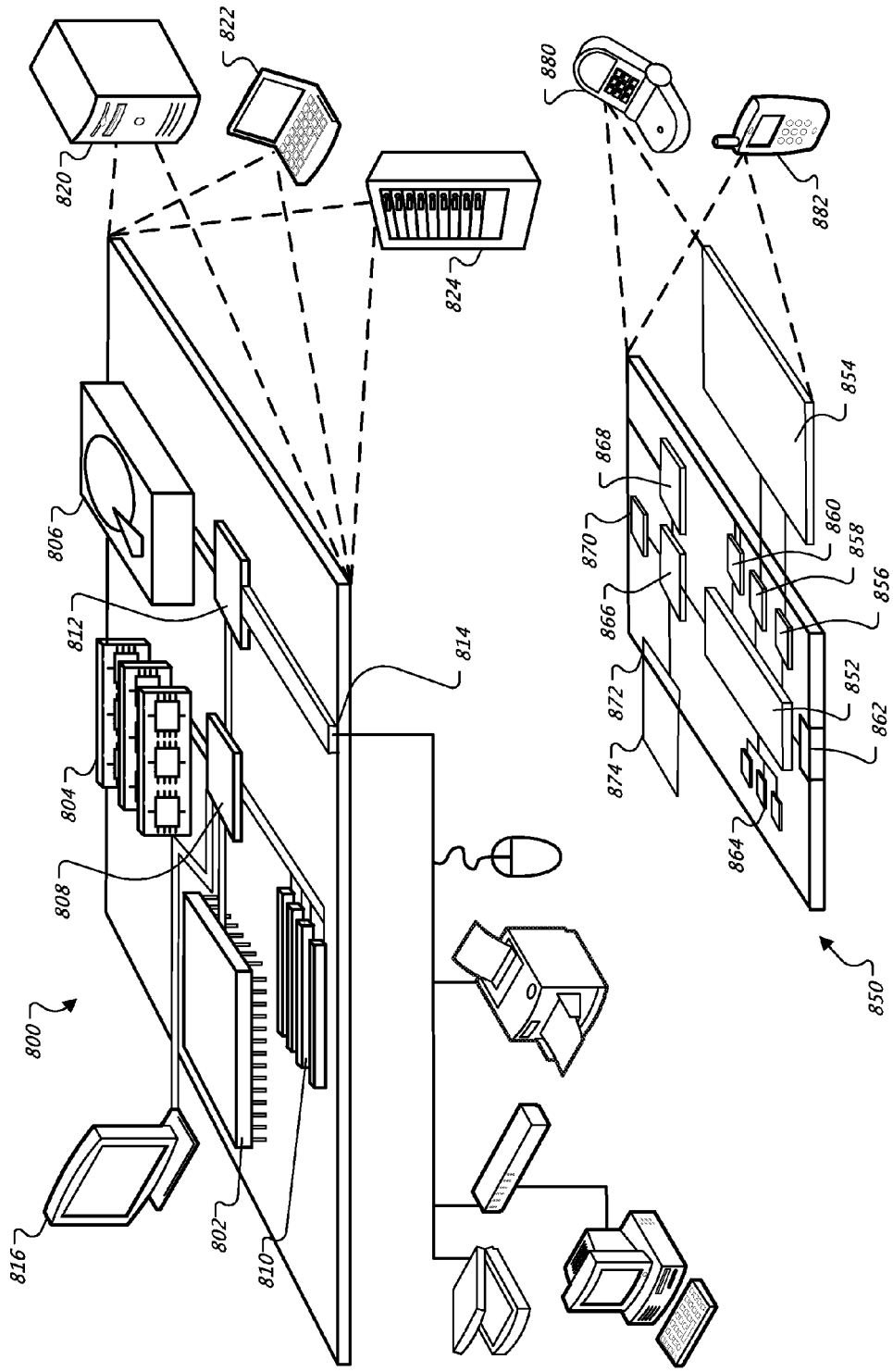
FIG. 8 is a block diagram of computing devices that may be used to implement the systems and methods described in this document, as either a client or as a server or plurality of servers.

FIG. 8 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. Additionally computing device 800 or 850 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for creating and adding information to contact records may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for assigning a field type to information added to a contact record, the method comprising:
    presenting, on a graphical user interface of a computing device, a display for a particular contact record, wherein the display includes (i) an identifier for a particular contact that is represented by the particular contact record and (ii) an input area;
    receiving first user input of first information using the input area;
    determining a first field type for the first information from among a plurality of field types, based on matching semantics of the received first information, wherein the determining occurs without receiving user input specifically identifying the first field type;
    presenting, in the display for the particular contact record and in response to determining the first field type, the determined first field type; and
    after presenting the determined first field type:
        receiving second user input of second information using the input area;
        determining a second field type for the second information from among the plurality of field types, based on matching semantics of the received second information, the determined second field type being different than the determined first field type, wherein the determining of the second field type occurs without receiving user input specifically identifying the second field type; and
        presenting, in the display for the particular contact record and in response to determining the second field type, the determined second field type.

2. The computer-implemented method of claim 1, wherein the plurality of field types includes a physical address field type, an email address field type, a website address field type, and a telephone number field type.

3. The computer-implemented method of claim 1, further comprising, in response to determining the first field type:
    receiving user confirmation of the determined first field type;
    adding, to the display for the particular contact record, a contact record entry that shows the first information and the first field type that has been confirmed; and
    presenting, in the display for the particular contact record, the input area as a cleared input area.

4. The computer-implemented method of claim 1, wherein presenting the determined first field type includes presenting an interface element of selectable field types that displays the determined first field type as a selected field type.

5. The computer-implemented method of claim 4, wherein, prior to determining the first field type, the display for the particular contact record did not present the interface element with the determined first field type as selected, further comprising, in response to determining the first field type:

receiving user modification of the determined first field type, using the interface element of selectable field types, in order to generate a modified field type; and adding, to the display for the particular contact record, a contact record entry that shows the first information and the modified field type.

6. The computer-implemented method of claim 1, further comprising:

receiving, with the input area, multiple sets of received user input, each set of received user input comprising one or more characters, wherein the multiple sets are received in a first order;

determining, for each set of received user input, a field type from the plurality of field types for the corresponding received user input based on matching semantics of the corresponding received user input, wherein the determining occurs without receiving user input specifically identifying the determined field type; and presenting, in the display, multiple contact record entries that include a contact record entry for each set of received user input and a corresponding determined field type for each set of received user input, the multiple contact record entries displayed in a second order that is different than the first order, the second order being determined based on the determined field types.

7. The computer-implemented method of claim 6, further comprising, grouping the multiple sets of received user input based on the determined field types.

8. The computer-implemented method of claim 1, wherein the input area is not associated with a field type before determining the first field type.

9. The computer-implemented method of claim 1, wherein the input area is an only input area presented in the display for the particular contact record.

10. The computer-implemented method of claim 1, further comprising:

prior to receiving the first user input of first information using the input area, displaying the input area at a first position within the display for the particular contact record; and after receiving the first user input of first information using the input area, displaying the input area at a second position within the display for the particular contact record, the second position being different from the first position.

11. A computer storage medium encoded with a computer program, the program comprising instructions that when executed by data processing apparatus cause the data processing apparatus to perform operations comprising:

presenting, on a graphical user interface of a computing device, a display for a particular contact record, wherein the display includes (i) an identifier for a particular contact that is represented by the particular contact record and (ii) an input area;

receiving first user input of first information using the input area;

determining a first field type for the first information from among a plurality of field types, based on matching semantics of the received first information, wherein the determining occurs without receiving user input specifically identifying the first field type;

presenting, in the display for the particular contact record and in response to determining the first field type, the determined first field type; and after presenting the determined first field type:
receiving second user input of second information using the input area;

determining a second field type for the second information from among the plurality of field types, based on matching semantics of the received second information, the determined second field type being different than the determined first field type, wherein the determining of the second field type occurs without receiving user input specifically identifying the second field type; and presenting, in the display for the particular contact record and in response to determining the second field type, the determined second field type.

12. The computer storage medium of claim 11, wherein the plurality of field types includes a physical address field type, an email address field type, a website address field type, and a telephone number field type.

13. The computer storage medium of claim 11, wherein the operations further comprise, in response to determining the first field type:

receiving user confirmation of the determined first field type;

adding, to the display for the particular contact record, a contact record entry that shows the first information and the first field type that has been confirmed; and presenting, in the display for the particular contact record, the input area as a cleared input area.

14. The computer storage medium of claim 11, wherein presenting the determined first field type includes presenting an interface element of selectable field types that displays the determined first field type as a selected field type.

15. The computer storage medium of claim 14, wherein, prior to determining the first field type, the display for the particular contact record did not present the interface element with the determined first field type as selected, and wherein the operations further comprise, in response to determining the first field type:

receiving user modification of the determined first field type, using the interface element of selectable field types, in order to generate a modified field type; and adding, to the display for the particular contact record, a contact record entry that shows the first information and the modified field type.

16. The computer storage medium of claim 11, wherein the operations further comprise:

receiving, with the input area, multiple sets of received user input, each set of received user input comprising one or more characters, wherein the multiple sets are received in a first order;

determining, for each set of received user input, a field type from the plurality of field types for the corresponding received user input based on matching semantics of the corresponding received user input, wherein the determining occurs without receiving user input specifically identifying the determined field type; and presenting, in the display, multiple contact record entries that include a contact record entry for each set of received user input and a corresponding determined field type for each set of received user input, the multiple contact record entries displayed in a second order that is different than the first order, the second order being determined based on the determined field types.

17. The computer storage medium of claim 16, wherein the operations further comprise, grouping the multiple sets of received user input based on the determined field types.

18. The computer storage medium of claim 11, wherein the input area is not associated with a field type before determining the first field type.

19. The computer storage medium of claim 11, wherein the input area is an only input area presented in the display for the particular contact record.

20. The computer storage medium of claim 11, wherein the operations further comprise:
- prior to receiving the first user input of first information using the input area, displaying the input area at a first position within the display for the particular contact record; and
- after receiving the first user input of first information using the input area, displaying the input area at a second position within the display for the particular contact record, the second position being different from the first position.

* * * * *